(12) United States Patent
Maruoka

(10) Patent No.: US 10,234,964 B2
(45) Date of Patent: Mar. 19, 2019

(54) IMAGE PROCESSING APPARATUS

(71) Applicant: Wacom Co., Ltd., Saitama (JP)

(72) Inventor: Isao Maruoka, Gunma (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 15/383,798

(22) Filed: Dec. 19, 2016

(65) Prior Publication Data
US 2018/0173333 A1 Jun. 21, 2018

(51) Int. Cl.
*G06F 3/0354* (2013.01)
*G06T 11/00* (2006.01)
*G06T 17/10* (2006.01)
*G06T 19/00* (2011.01)
*H04N 13/00* (2018.01)

(52) U.S. Cl.
CPC ........ *G06F 3/03545* (2013.01); *G06T 11/001* (2013.01); *G06T 17/10* (2013.01); *G06T 19/00* (2013.01); *H04N 13/00* (2013.01); *G06T 2200/24* (2013.01)

(58) Field of Classification Search
None
See application file for complete search history.

(56) References Cited

U.S. PATENT DOCUMENTS

| 8,232,990 | B2 | 7/2012 | King et al. | |
| 9,142,056 | B1* | 9/2015 | Baran | G06T 15/00 |
| 2003/0048277 | A1* | 3/2003 | Maillot | G06T 11/001 |
| | | | | 345/582 |
| 2007/0268304 | A1* | 11/2007 | Hsu | G06T 11/001 |
| | | | | 345/592 |
| 2013/0057540 | A1* | 3/2013 | Winnemoeller | G06T 15/80 |
| | | | | 345/419 |
| 2016/0070371 | A1* | 3/2016 | Oonishi | G06F 3/044 |
| | | | | 345/174 |
| 2017/0336939 | A1* | 11/2017 | Kim | G06F 3/0488 |

FOREIGN PATENT DOCUMENTS

| JP | 5275283 A | 10/1993 |
| JP | 2002513480 A | 5/2002 |
| JP | 2011186803 A | 9/2011 |
| JP | 2013161307 A | 8/2013 |

* cited by examiner

*Primary Examiner* — Ryan M Gray
(74) *Attorney, Agent, or Firm* — Seed IP Law Group LLP

(57) ABSTRACT

An image processing apparatus includes detection circuitry and processing circuitry. The detection circuitry, in operation, detects a position on a sensor that is pointed to by a pointer. The processing circuitry, in operation, generates three-dimensional data that includes the position detected by the detection circuitry, positions a two-dimensional surface relative to the position detected by the detection circuitry, and applies rendering to, at least, part of the three-dimensional data that is arranged on one side of the two-dimensional surface to be displayed on a display screen.

20 Claims, 6 Drawing Sheets

FIG. 2
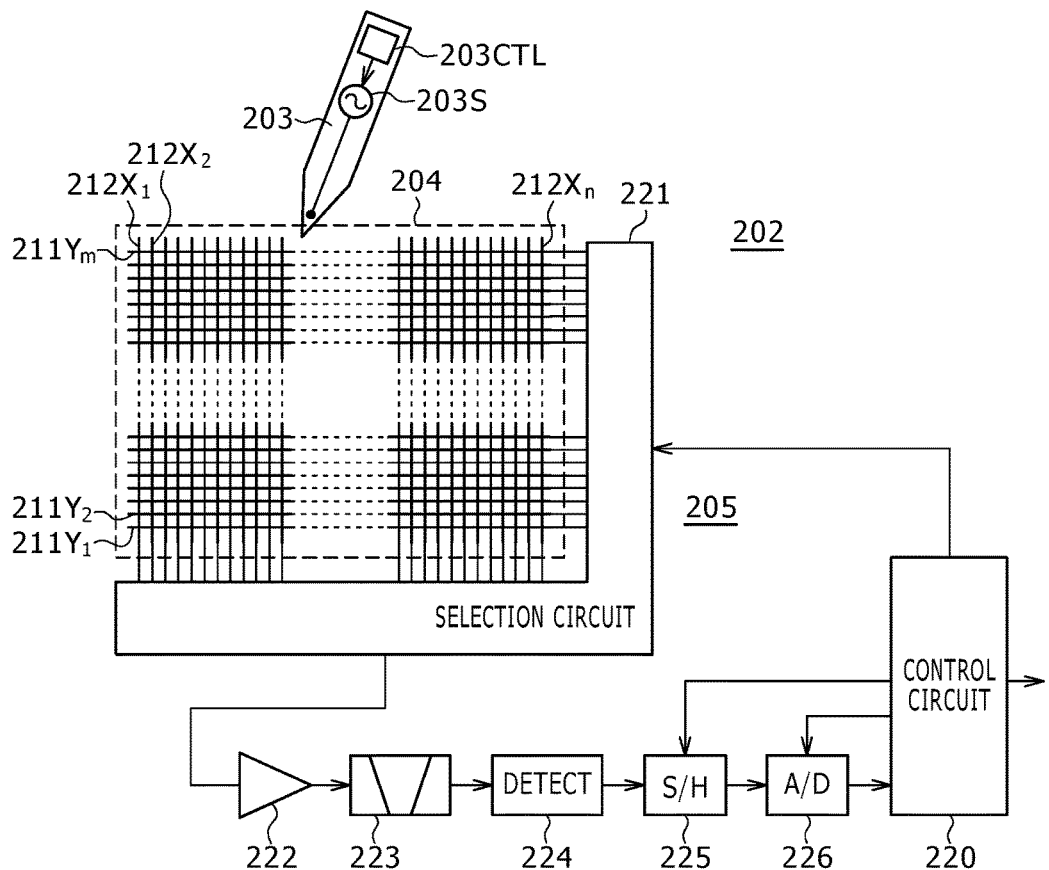
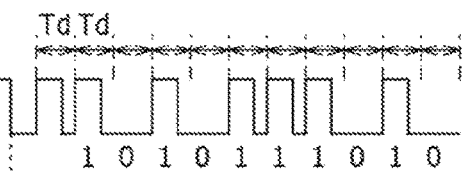
FIG. 3A
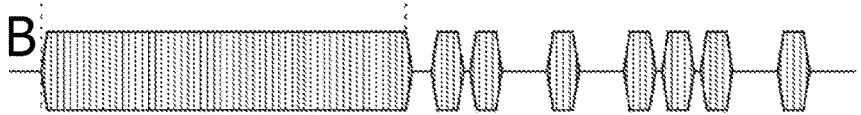
FIG. 3B
FIG. 3C

IMAGE PROCESSING APPARATUS

BACKGROUND

1. Technical Field

The present disclosure relates to an image processing apparatus that enables a three-dimensional (3D) (three-dimensional) image to be shown on a display screen from coordinate data that represents detection output of a position pointed to by a pointer such as finger or electronic pen.

2. Description of the Related Art

Technologies are available that allow for generation of 3D three-dimensional images and showing them on a display screen. For example, Japanese Translations of PCT for Patent No. 2002-513480 discloses a technology that converts a two-dimensional (2D) photographic picture into a 3D modeled object and also converts the 3D modeled object back into the original 2D photographic picture.

If the user performs pointing input with an electronic pen to draw a line, for example, it is common that the drawn line appears on a display screen as an image shown on the display screen using coordinate data that represents detection output of a position pointed to by a pointer such as finger or electronic pen. A tablet is known that associates the electronic pen, for example, with a paint brush. Also in this case, if the user makes a pointing input with an electronic pen to draw a line, a line that matches a tip width of the associated brush appears on the display screen.

Incidentally, when one draws with a brush and paints on a canvas, the paints on the canvas have thicknesses. Digital inks have no thicknesses when one draws a stroke on a sensor of a position detection section with a pointer such as an electronic pen or finger. Although it is possible to achieve representation that artificially makes the inks look as if they had thicknesses by applying a shadow, it is difficult to represent textures.

BRIEF SUMMARY

In light of the foregoing, it is desirable to provide an image processing apparatus that enables translation of pointing input by a pointer, through comparatively simple process, so that thicknesses can be represented as if the stroke was drawn, for example, with an oil paint.

According to an embodiment of the present disclosure, there is provided an image processing apparatus that includes detection circuitry and processing circuitry. The detection circuitry, in operation, detects a position on a sensor pointed to by a pointer. The processing circuitry, in operation, generates three-dimensional data that includes the position detected by the detection circuitry, positions a two-dimensional surface relative to the position detected by the detection circuitry, and applies rendering to, at least, part of the three-dimensional data that is arranged on one side of the two-dimensional surface to be displayed on a display screen.

In the image processing apparatus according to the above embodiment, the processing circuitry generates three-dimensional data that includes the position detected by the detection circuitry. For example, the processing circuitry uses spheres as a three-dimensional shape, and generates spherical three-dimensional data that includes the position detected by the detection circuitry at the center of the sphere.

Then, the processing circuitry positions a two-dimensional surface relative to the position detected by the detection circuitry. Then, the processing circuitry applies rendering to, at least, part of the three-dimensional data that is arranged on one side of the two-dimensional surface to be displayed on the display screen.

The image appearing on the display screen using this image information is something similar to 3D three-dimensional graphics appearing on a two-dimensional screen. This makes it possible for the image processing apparatus according to the above embodiment to generate, through simple processes, image information that enables translation of pointing input by a pointer so that it appears puffy as if it was drawn, for example, with an oil paint.

The present disclosure provides an advantageous effect in that image information is generated that enables translation of pointing input by the pointer detected by the detection circuitry so that a thickness can be represented as if it was drawn, for example, with an oil paint.

BRIEF DESCRIPTION OF THE DRAWINGS

FIG. 2 is a diagram for describing a configuration example of a position detection section used in an embodiment of the image processing apparatus according to the present disclosure;

FIGS. 3A to 3C are diagrams for describing a processing example of the position detection section used in an embodiment of the image processing apparatus according to the present disclosure;

DETAILED DESCRIPTION

An embodiment of an image processing apparatus according to the present disclosure will be described below with reference to the accompanying drawings.

Figure 1:
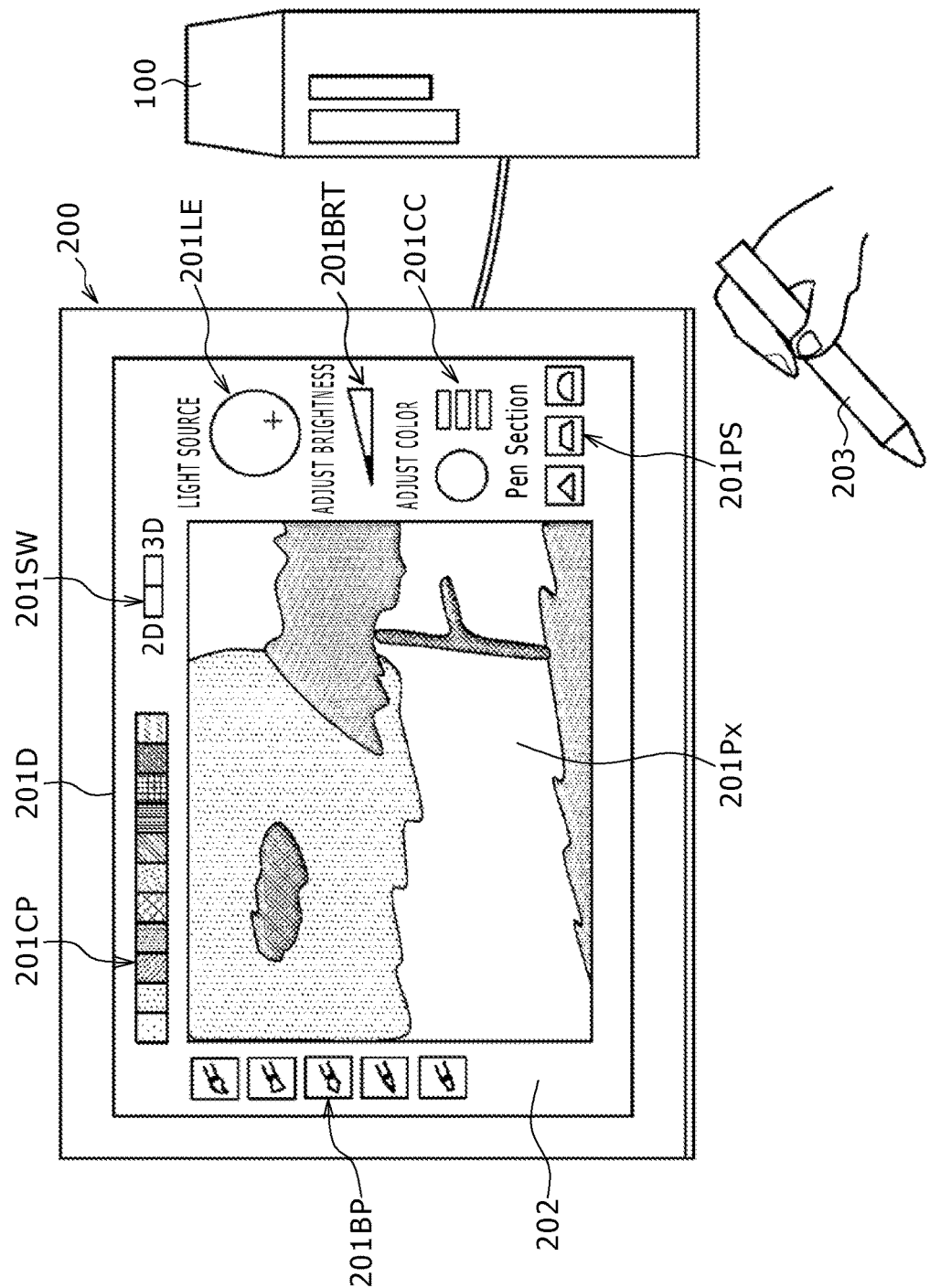
FIG. 1 is a diagram illustrating an overall outline of an embodiment of an image processing apparatus according to the present disclosure.

FIG. 1 is a diagram illustrating a configuration example of the image processing apparatus according to the present embodiment. In this example, the image processing apparatus includes a main body 100 of the image processing apparatus and a tablet terminal 200 having a display function. The main body 100 of the image processing apparatus includes, for example, a computer. Then, in this example, the tablet terminal 200 is connected to the main body 100 of the image processing apparatus via a cable 300.

In this example, the tablet terminal 200 includes a display section 201 that includes, for example, a liquid crystal display (LCD) panel. Further, the tablet terminal 200 includes a capacitive position detection section 202 on the back of the display section 201 in this example. As an example of a pointer, an electronic pen 203 is supplied with the tablet terminal 200.

The electronic pen 203 in this example includes a signal transmission circuit to send a position detection signal to the position detection section 202. Further, in this example, the electronic pen 203 includes a writing pressure detection section to detect a writing pressure applied to a tip thereof. Writing pressure information detected by the writing pressure detection section is sent to the position detection section 202 of the tablet terminal 200.

In this example, the position detection section 202 includes a position detection sensor that is approximately the same size as a display screen 201D of the display section 201. The position detection section 202 detects the position on the position detection sensor pointed to by the electronic pen 203 as two-dimensional XY coordinates by detecting the position detection signal. Further, the position detection section 202 of the tablet terminal 200 receives writing pressure information from the electronic pen 203, thus detecting the writing pressure from the received information. Then, the tablet terminal 200 pairs each piece of coordinate data of the position pointed to by the electronic pen 203 detected by the position detection section 202 and the writing pressure applied to that pointed position and sends this information pair to the main body 100 of the image processing apparatus.

A control item menu is displayed on the display screen 201D of the tablet terminal 200 in addition to an image display field 201Px. The control item menu, shown in a frame area around the image display field 201Px, allows for the user to select and set parameters for generating an image. The main body 100 of the image processing apparatus generates information to be shown in the control item menu in the frame area around the image display field 201Px, sending the information to the tablet terminal 200 and showing it on the display screen 201D.

The user selects desired parameters and options from the control item menu in the frame area around the image display field 201Px by pointing with the electronic pen 203. The main body 100 of the image processing apparatus recognizes where the parameters and options of the control item menu in the frame area around the image display field 201Px are shown. Therefore, the main body 100 of the image processing apparatus detects which parameters and options have been selected by the user from coordinate information of the position pointed to by the electronic pen 203.

In the example illustrated in FIG. 1, a 2D/3D switching button 201SW appears in the upper frame area of the image display field 201Px. The 2D/3D switching button 201SW enables selection of whether to draw a 2D or 3D image in the image display field 201Px with the electronic pen 203. The example illustrated in the frame area of FIG. 1 shows a case in which the 2D/3D switching button 201SW is in the 3D position. In this example, a color palette 201CP with a plurality of display colors is displayed in the upper frame area of the image display field 201Px. By selecting an arbitrary display color from among a plurality of colors, the user can select a display color for the image at the coordinate position pointed to by the electronic pen 203.

Then, in this example, a brush type selection section 201BP appears on the left of the image display field 201Px to select a brush type to be associated with the pointer. By selecting an arbitrary brush or pen type from among a plurality thereof, the user can draw an image with the selected brush or pen type at the coordinate position pointed to by the electronic pen 203.

Further, in this example, a light source change section 201LE, a brightness adjustment section 201BRT, a color adjustment section 201CC, and a 3D reference shape selection section 201PS appear on the right of the image display field 201Px. The user can change, with the light source change section 201LE, at least either the light source position or type during rendering for generating a 3D image. As used herein, rendering or "applying rendering to" means generating an image to be displayed on a display screen, for example, the display screen 201D and it may include surface rendering and volume rendering. A rendering section 110 can make an adjustment so that rendering is performed in real-time in accordance with at least either the light source position or type changed by the light source change section 201LE. Further, the light source change section 201LE may automatically change at least either the light source position or type during rendering for generating a 3D image. For example, light source positions and types suitable for different seasons or times may be set in advance so that at least either the light source position or type changes automatically. Also in this case, the rendering section 110 can make adjustment so that rendering is performed in real-time in accordance with at least either the light source position or type changed by the light source change section 201LE.

Further, the user can adjust, with the brightness adjustment section 201BRT, the brightness of the 3D image appearing on the display screen. Still further, the user can adjust, with the color adjustment section 201CC, the chromaticity of the 3D image appearing on the display screen.

The 3D reference shape selection section 201PS is used to select a 3D reference shape during generation of 3D volume data from coordinate input of the position pointed to by the electronic pen 203. In the example illustrated in FIG. 1, the 3D reference shape selection section 201PS has different selectable shapes. For example, sphere, cone, truncated cone, and other shapes are shown, and the user can select one of these shapes. It should be noted that the 3D reference shapes that can be selected with the 3D reference shape selection section 201PS are not limited thereto. Instead, selectable shapes may include not only a cylinder but also columnar bodies with tetragonal, pentagonal, hexagonal and other cross-sections. The 3D reference shapes may further include columnar bodies with cross-sections of arbitrary shapes.

The main body 100 of the image processing apparatus acquires coordinate data and writing pressure information of the position pointed to by the electronic pen 203 from the position detection section 202 of the tablet terminal 200. The main body 100 of the image processing apparatus detects the selected parameters and control items from the acquired coordinate data and writing pressure information, generating display image data in accordance with the detected parameters and control items and sending the data to the tablet terminal 200. The tablet terminal 200 shows the image information received from the main body 100 of the image processing apparatus in the image display field 201Px in the display screen of the display section 201.

Configuration Example of Position Detection Section of Tablet Terminal 200

The position detection section 202 according to the present embodiment includes a sensor 204 and a pen pointing detection circuit 205 connected to the sensor 204 as illustrated in FIG. 2. The sensor 204 has a sensor surface (pointing input face) that is comparable in size to the display screen 201D of the tablet terminal 200. The sensor 204 is light transmissive and includes first and second conductor groups 211 and 212.

The first conductor group 211 includes a plurality of first conductors $211Y_1$ to $211Y_m$ (where m is an integer equal to or greater than 1) that extend, for example, horizontally (x-axis direction) and are arranged parallel to each other in the y-axis direction with a given spacing therebetween. On the other hand, the second conductor group 212 includes a plurality of second conductors $211X_1$ to $211X_n$ (where n is an integer equal to or greater than 1) that extend in a direction intersecting the direction of extension of the first conductors $211Y_1$ to $211Y_m$. In this example, the second conductors $211X_1$ to $211X_n$ extend vertically (y-axis direction) in a direction orthogonal to the direction of extension of the first conductors $211Y_1$ to $211Y_m$ and are arranged parallel to each other in the x-axis direction with a given spacing therebetween.

In the description given below, the first conductors $211Y_1$ to $211Y_m$ and the second conductors $212X_1$ to $212X_n$ will be referred to as the first and second conductors 211Y and 212X, respectively, if it is not necessary to distinguish between the individual conductors.

The pen pointing detection circuit 205 includes a selection circuit 221, an amplification circuit 222, a band-pass filter 223, a detection circuit 224, a sample-hold circuit 225, an analog to digital (AD) conversion circuit 226, and a control circuit 220. The selection circuit 221 serves as an input/output interface with the sensor 204.

The selection circuit 221 selects a conductor from among each of the first and second conductor groups 211 and 212 based on the control signal supplied from the control circuit 220. The conductors selected by the selection circuit 221 are connected to the amplification circuit 222. The signal from the electronic pen 203 is detected by the selected conductors and amplified by the amplification circuit 222. The output of the amplification circuit 222 is supplied to the band-pass filter 223, thus extracting only the frequency component of the signal sent from the electronic pen 203.

The output signal of the band-pass filter 223 is detected by the detection circuit 224. The output signal of the detection circuit 224 is supplied to the sample-hold circuit 225 that samples the signal at a given timing using a sampling signal from the control circuit 220 and stores the sampled value, after which the sampled value is converted into a corresponding digital value by the AD conversion circuit 226. Digital data supplied from the AD conversion circuit 226 is read by the control circuit 220 for necessary processing.

Thanks to the program stored in an internal read-only memory (ROM), the control circuit 220 operates in such a manner as to send a control signal to each of the sample-hold circuit 225, the AD conversion circuit 226, and the selection circuit 221. Further, the control circuit 220 calculates the coordinates of the position on the sensor 204 pointed to by the electronic pen 203 from the digital data supplied from the AD conversion circuit 226, outputting that position coordinate data to other image processors in the tablet terminal 200.

FIGS. 3A to 3C are timing diagrams for describing a given pattern signal received by the sensor 204 of the position detection section 202 from the electronic pen 203 according to the present embodiment. The electronic pen 203 according to the present embodiment includes a signal transmission circuit 203S and a control circuit 203CTL. Thanks to a control signal supplied from the control circuit 203CTL, the signal transmission circuit 203S repeatedly outputs a signal having a given pattern.

FIG. 3A illustrates an example of a control signal supplied from the control circuit 203CTL that controls the signal transmission circuit 203S of the electronic pen 203. For a set time period in which the signal remains high, the electronic pen 203 successively outputs a transmission signal (alternating current (AC) signal at a given frequency) in the form of a burst signal from the signal transmission circuit 203S (continuous transmission period in FIG. 3C) as illustrated in FIG. 3B.

The continuous transmission period is long enough for the pen pointing detection circuit 205 of the position detection section 202 to detect the position on the sensor 204 pointed to by the electronic pen 203. For example, the continuous transmission period is long enough to scan all the first and second conductors 211Y and 212X once or more and preferably a plurality of times or more.

During the continuous transmission period, the control circuit 203CTL of the electronic pen 203 detects the writing pressure applied to the pen tip, thus finding the writing pressure as a multiple bit value (binary code) from the detection result. Although not illustrated, the writing pressure detection section having a known configuration described in Japanese Patent Laid-Open No. 1993-275283 or Japanese Patent Laid-Open No. 2011-186803, for example, may be applied for use as the writing pressure detection section. Further, for example, a semiconductor element with variable capacitance in accordance with the writing pressure may also be applied as disclosed in Japanese Patent Laid-Open No. 2013-161307.

Then, when the continuous transmission period ends, the control circuit 203CTL of the electronic pen 203 inserts a start signal and begins a transmission data period as illustrated in FIG. 3C. During the transmission data period, the control circuit 203CTL controls the control signal (refer to FIG. 3A) to a high or a low level at given intervals (Td), thus amplitude shift keying (ASK) modulating the transmission signal from the signal transmission circuit 203S. The transmission signal from the signal transmission circuit 203S may be modulated into an on off keying (OOK) signal rather than using ASK modulation.

At this time, the control signal is typically at the high level in the first given interval (Td) following the continuous transmission period and used as a start signal as illustrated in FIG. 3C. This start signal is a timing signal to allow for accurate determination on the subsequent data transmission timings by the position detection section 202. It should be noted that a burst signal during the continuous transmission period may be used as a timing signal rather than this start signal.

The electronic pen 203 sends writing pressure data, transmission data (digital data) made up of a given number of bits, one after another following the start signal during the transmission data period. In this case, when the transmission data (binary code) is '0', the electronic pen 203 pulls the control signal to the low level and does not send any transmission signal. On the other hand, when the transmission data (binary code) is '1', the electronic pen 203 pulls the control signal to the high level and sends a transmission signal. The electronic pen 203 repeatedly sends a pattern signal made up of a continuous transmission period and a transmission data period as described above at intervals based on control performed by the control circuit 203CTL.

In the pen pointing detection circuit 205 of the position detection section 202, for example, the control circuit 220 supplies a selection signal to the selection circuit 221. The selection signal is used to select the second conductors $212X_1$ to $212X_n$ one after another. When each of the second conductors $212X_1$ to $212X_n$ is selected, the control circuit 220 reads the data output from the AD conversion circuit 226 as a signal level. Then, if the signal level of none of the second conductors $212X_1$ to $212X_n$ reaches a given value, the control circuit 220 determines that the electronic pen 203 is not on the sensor 204, repeatedly selecting the second conductors $212X_1$ to $212X_n$ one after another.

If signal levels equal to or higher than the given value are detected from the second conductors $212X_1$ to $212X_n$, the control circuit 220 stores the number of the second conductor 212X with the highest detected signal level and those of the plurality of second conductors 212X around the second conductor 212X with the highest signal level. Then, the control circuit 220 selects the first conductors $211Y_1$ to $211Y_m$ one after another and reads the signal levels supplied from the AD conversion circuit 226 by controlling the selection circuit 221. At this time, the control circuit 220 stores the number of the first conductor 211Y with the highest detected signal level and those of the plurality of first conductors 211Y around the first conductor 211Y with the highest signal level.

Then, the control circuit 220 detects the position on the sensor 204 pointed to by the electronic pen 203 from the numbers of the second and first conductors 212X and 211Y with the highest detected signal levels and those of the pluralities of second and first conductors 212X and 211Y thereround.

When the signal level detection is over following the selection of the final first conductor $211Y_m$ by the selection circuit 221, the control circuit 220 waits for the end of the continuous transmission period of the signal transmitted from the electronic pen 203. When the control circuit 220 detects a start signal following the end of the continuous transmission period, the control circuit 220 performs an operation to read transmission data such as writing pressure data, thus receiving such transmission data as an ASK or OOK signal. Then, the control circuit 220 pairs at least coordinate data of the position pointed to by the electronic pen 203 and writing information and sends this information pair to the main body 100 of the image processing apparatus.

Configuration Example of Main Body 100 of
Image Processing Apparatus

Figure 4:
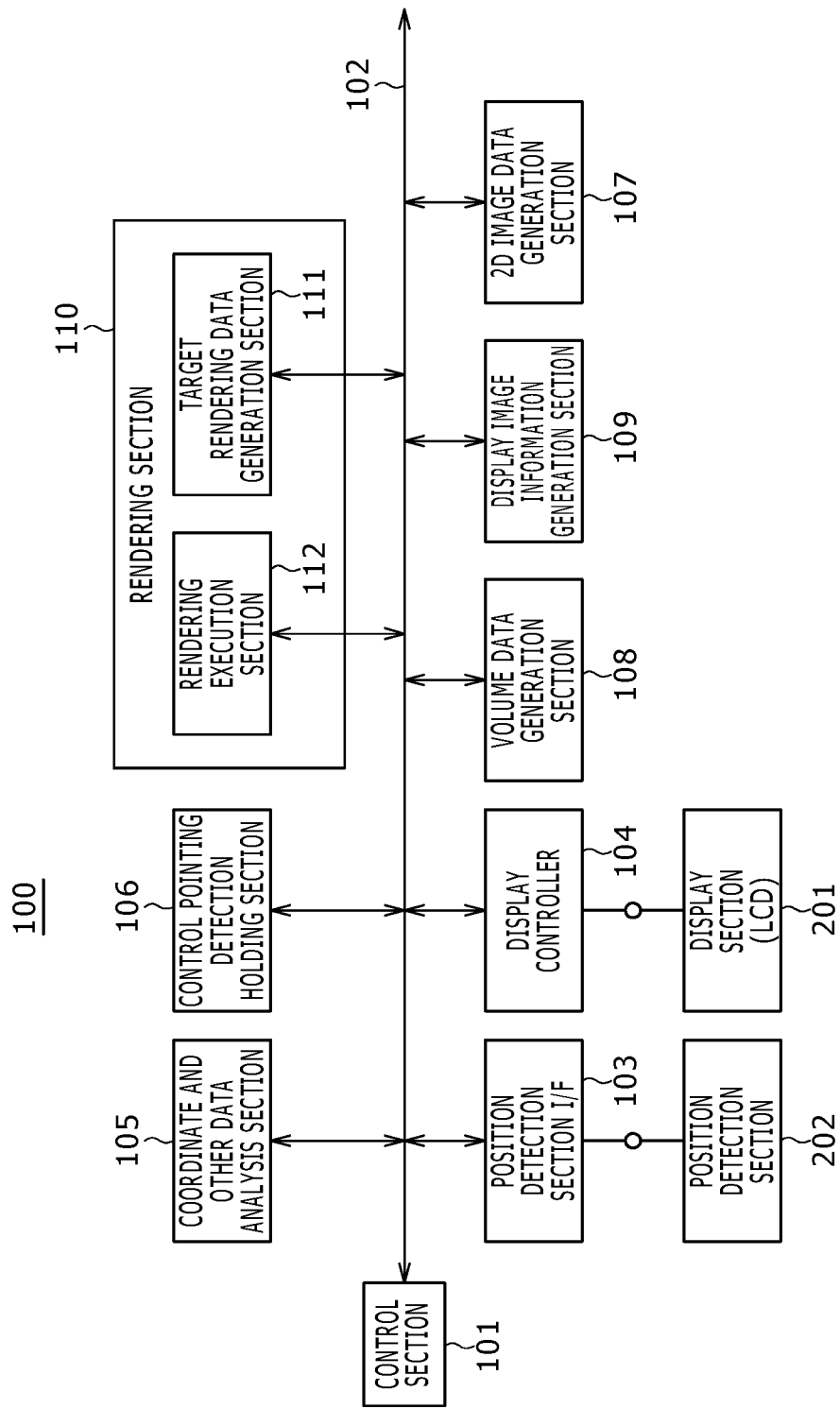
FIG. 4 is a diagram illustrating a hardware configuration example of a main body of the image processing apparatus in an embodiment of the image processing apparatus according to the present disclosure.

FIG. 4 is a block diagram illustrating a configuration example of the main body 100 of the image processing apparatus. As described earlier, the main body 100 of the image processing apparatus includes a computer in this example. A control section 101 includes a central processing section (CPU). A position detection section interface (denoted as I/F in FIG. 4) 103, a display controller 104, a coordinate and other data analysis section 105, a control pointing detection holding section 106, a 2D image data generation section 107, a volume data generation section 108, a display image information generation section 109, and a rendering section 110 are individually connected to the control section 101 via a system bus 102.

The position detection section 202 of the tablet terminal 200 is connected to the position detection section interface 103. When coordinate data and writing pressure information are received from the position detection section 202, the position detection section interface 103 sends the received coordinate data and writing pressure information to the coordinate and other data analysis section 105.

Further, the display section 201 of the tablet terminal 200 is connected to the display controller 104. Display image information generated by the display image information generation section 109 is supplied to the display section 201 of the tablet terminal 200 via this display controller 104 and appears on the display screen 201D thereof as will be described later.

The coordinate and other data analysis section 105 detects whether the coordinates of the received coordinate data fall within the image display field 201Px of the display section 201 of the tablet terminal 200 or within the surrounding frame area thereof. Then, the coordinate and other data analysis section 105 sends the coordinates in the frame area around the image display field 201Px to the control pointing detection holding section 106.

The control pointing detection holding section 106 determines, from the coordinate data received from the coordinate and other data analysis section 105, which control items, i.e., the 2D/3D switching button 201SW, the color palette 201CP, the brush type selection section 201BP, the light source change section 201LE, the brightness adjustment section 201BRT, the color adjustment section 201CC, and the 3D reference shape selection section 201PS, was selected by pointing. The control pointing detection holding section 106 stores the determined results as control pointing data.

In the meantime, when the coordinates of the coordinate data fall within the image display field 201Px, the coordinate and other data analysis section 105 refers to the status of the 2D/3D switching button 201SW stored in the control pointing detection holding section 106. When the 2D/3D switching button 201SW is in the 2D position, the coordinate and other data analysis section 105 supplies the coordinate data to the 2D image data generation section 107. On the other hand, when the 2D/3D switching button 201SW is in the 3D position, the coordinate and other data analysis section 105 supplies the coordinate data to the volume data generation section 108. It should be noted that, in this case, the coordinate and other data analysis section 105 sends coordinate data and writing pressure data as a pair as described earlier.

The 2D image data generation section 107 generates image information of a line drawing that matches a stroke, successive positions pointed to by the electronic pen 203. In this case, the line thickness changes in accordance with writing pressure information. Further, when a wide brush is selected in the brush type selection section 201BP, the 2D image data generation section 107 generates image information made up of lines whose width matches the brush width. The 2D image data generation section 107 supplies generated image information to the display image information generation section 109.

The display image information generation section 109 converts the received image information into display image information, information to be shown on the display screen of the display section 201, supplying the converted display image information to the display section 201 via the display controller 104. Therefore, when the 2D/3D switching button 201SW is in the 2D position, a line drawing image that matches the stroke, successive positions pointed to by the electronic pen 203, appears on the display screen of the display section 201.

When the 2D/3D switching button 201SW is in the 3D position, the volume data generation section 108 receives coordinate data and writing pressure information from the coordinate and other data analysis section 105, thus generating volume data. In this case, the volume data generation section 108 generates volume data within the three-dimensional shape selected in the 3D reference shape selection section 201PS in the present embodiment. In that case, the volume data generation section 108 associates a given position within the selected three-dimensional shape with the coordinate data position supplied from the coordinate and other data analysis section 105 and generates volume data as a three-dimensional shape of the size according to the writing pressure of the writing pressure information.

Then, in the present embodiment, the brush type selected in the brush type selection section 201BP is identified. The three-dimensional shape according to the writing pressure of the writing pressure information is varied in accordance with the identified brush type. That is, for example, volume data may be generated so that even if the writing pressure is the same, the three-dimensional shape is larger in size when drawn with a thick brush than a thin brush.

Figure 5A:
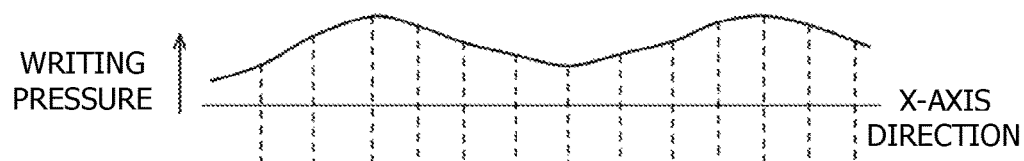
FIGS. 5A to 5D are diagrams for describing main parts of an embodiment of the image processing apparatus according to the present disclosure.
Figure 5B:
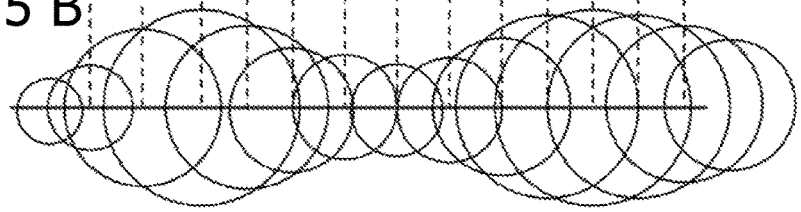
Figure 5C:
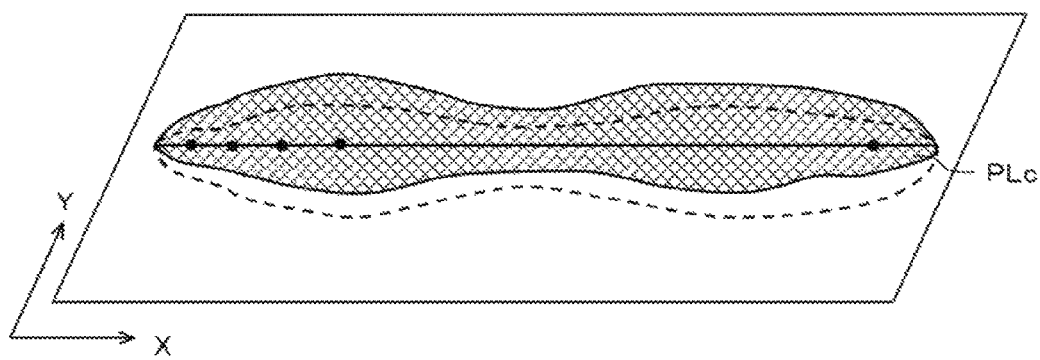
Figure 5D:
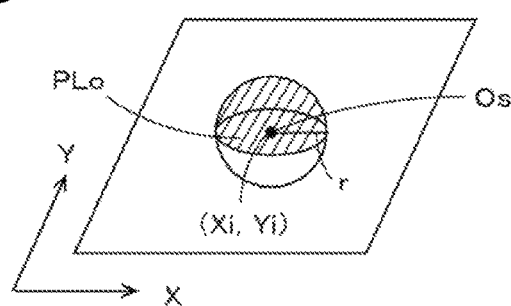

If the three-dimensional shape selected in the 3D reference shape selection section 201PS is, for example, a sphere, the volume data generation section 108 places coordinates (Xi, Yi) acquired from the coordinate and other data analysis section 105 at a given position in the sphere such as at a center (center of gravity) Os thereof as illustrated in FIG. 5D, thus generating spherical volume data of a radius r according to the writing pressure of the writing pressure information. In this case, the magnitude of the radius r varies depending on the selected brush type as described earlier. It should be noted that it is not necessary for each brush type to have a different radius r and that the two or more brush types may have the same radius r.

It should be noted that when position pointing input is made to the position detection section 202 with the tip of the electronic pen 203 in contact with the position pointing input face on the sensor 204 of the position detection section 202 (surface of the display screen 201D in this example), it is only necessary to set, for example, Z=0 as the z coordinate in the z-axis direction orthogonal to the x- and y-axis directions. Then, writing pressures that match the respective coordinate positions are applied to the electronic pen 203.

It should be noted that even if the three-dimensional shape selected in the 3D reference shape selection section 201PS is other than a sphere, volume data can be similarly generated by placing the coordinates (Xi, Yi) acquired from the coordinate and other data analysis section 105 at the center (center of gravity) of each of the three-dimensional shapes and by generating volume data that matches the writing pressure of the writing pressure information and whose size matches the selected brush type.

It should be noted that the present disclosure is not limited to placing the coordinates (Xi, Yi) acquired from the coordinate and other data analysis section 105 at the center (center of gravity) of each of the three-dimensional shapes. Instead, it may associate the coordinates (Xi, Yi) acquired from the coordinate and other data analysis section 105 with a given position set within the three-dimensional shape.

Volume data generated by the volume data generation section 108 is sent to the rendering section 110. The rendering section 110 sets a two-dimensional surface (e.g., a two-dimensional plane or a two-dimensional curved surface), applying rendering to the volume data that is on one side of the set two-dimensional surface of all the volume data sent based on the coordinates acquired from the coordinate and other data analysis section 105. As a two-dimensional surface to be set, a virtual surface can be used which matches the display screen 201D on the sensor surface (sensor plane) of the display section 201. That is, the volume data that is on one side of the set two-dimensional surface corresponds to the portion bulging up on the display screen 201D.

That is, in this example, the rendering section 110 uses a target rendering data generation section 111 to set a circular plane PLo that is parallel with the two-dimensional surface (X-Y plane in this example), the pointing input face of the sensor 204, and whose Z=0 first within the received volume data as illustrated in FIG. 5D based on coordinates (Xi, Yi, Z=0) acquired from the coordinate and other data analysis section 105. Then, the target rendering data generation section 111 considers one side of the set plane PLo, and in this example, the portion of the volume data that is on the front side (shaded in FIG. 5D) to be the one subjected to rendering. It should be noted that we assume in this example that a light source is provided on the front side of the plane PLo during rendering. Therefore, the volume data to be subjected to rendering is the portion that is on the front side of the plane PLo that is exposed to more light thanks to the light source.

Next, a rendering execution section 112 of the rendering section 110 applies surface rendering, in this example, to the target portion of volume data generated by the target rendering data generation section 111. Then, the rendering section 110 sends the rendered portion of volume data to the display image information generation section 109. In this surface rendering, the light source position specified in the light source change section 201LE is referred to. At the same time, necessary adjustments are made using the adjustment levels selected in the brightness adjustment section 201BRT and color adjustment section 201CC to obtain an image that represents a thick-looking digital ink texture.

The description given above focused on volume data generation and rendering for a single point (single set of coordinates) whose position was pointed to by the electronic pen 203. However, when the actual position pointing input made by the user with the electronic pen 203 is a stroke, successive positions pointed to by the electronic pen 203 may be used.

For example, a description will be given below of a case in which the user moves the tip of the electronic pen 203 to draw a straight line in the x-axis direction with the tip of the electronic pen 203 in contact with the position pointing input face on the sensor 204 of the position detection section 202.

In this case, we assume that the writing pressure at each of the coordinate positions during movement of the tip of the electronic pen 203 in the x-axis direction changes as illustrated in FIG. 5A. Then, each set of coordinates and each piece of writing pressure information are supplied to the volume data generation section 108 via the coordinate and other data analysis section 105 during movement of the tip of the electronic pen 203.

The volume data generation section 108 places each set of coordinates successively sent from the coordinate and other data analysis section 105 at the center (center of gravity) Os of a sphere in this example as illustrated in FIG. 5D, generating spherical volume data of the radius r according to the writing pressure of the writing pressure information. In this case, volume data generated for the respective sets of coordinates partially overlaps each other as illustrated in FIG. 5B. As for these overlaps, the portion of volume data generated later is preserved. As a result, the volume data generation section 108 generates volume data that matches the three-dimensional shape as illustrated in FIG. 5C in response to stroke input from the electronic pen 203, supplying the volume data to the rendering section 110.

Then, the target rendering data generation section 111 of the rendering section 110 sets a plane PLc within the volume data as illustrated in FIG. 5C based on each set of coordinates acquired from the coordinate and other data analysis section 105. The plane PLc includes all the sets of coordinates, is parallel with the two-dimensional surface (X-Y plane in this example), the pointing input face of the sensor 204, and has Z=0. Then, the target rendering data generation section 111 considers one side of the set plane PLc, and in this example, the portion of the volume data that is on the front side (shaded in FIG. 5C) to be volume data subjected to rendering.

Next, the rendering execution section 112 of the rendering section 110 applies surface rendering, in this example, to the target portion of volume data generated by the target rendering data generation section 111. Then, the rendering section 110 sends the rendered portion of volume data to the display image information generation section 109.

The display image information generation section 109 converts the received image information into display image information, information to be shown on the display screen of the display section 201, supplying the converted display image information to the display section 201 via the display controller 104. Therefore, when the 2D/3D switching button 201SW is in the 3D position, an image is shown on the display screen of the display section 201 that looks three-dimensionally puffy in accordance with the stroke, successive positions pointed to by the electronic pen 203.

It should be noted that the components making up the main body 100 of the image processing apparatus in FIG. 4 as described earlier, namely, the display controller 104, the coordinate and other data analysis section 105, the control pointing detection holding section 106, the 2D image data generation section 107, the volume data generation section 108, the display image information generation section 109, and the rendering section 110, may be implemented in the form of circuitry including a combination of hardware and software, for example, software functional sections that can be executed by the program stored in the storage apparatus (not shown), and any of the sections can be combined together or further divided into sub-sections according to each implementation.

Example of Processing Operation Flow of Main Body 100 of Image Processing Apparatus A description will be given below of an example of a processing operation flow of the main body 100 of the image processing apparatus with reference to the flowchart shown in FIG. 6.

Figure 6:
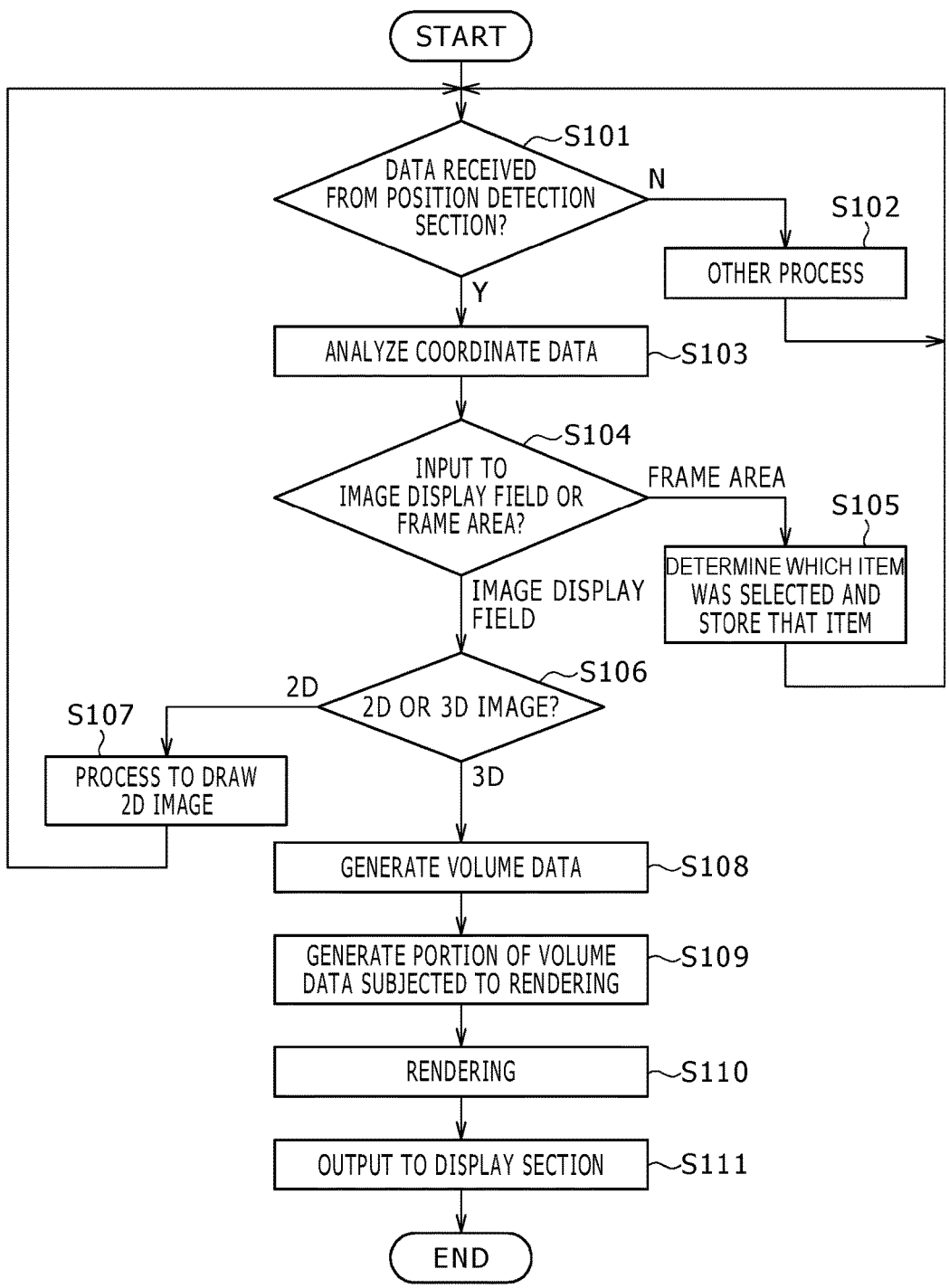
FIG. 6 is a diagram illustrating a flowchart for describing an example of processing operations of the main body of the image processing apparatus in an embodiment of the image processing apparatus according to the present disclosure.

It should be noted that we assume in the description given below that the process in each step of the flowchart in FIG. 6 is performed by the control section 101 by executing each of the display controller 104, the coordinate and other data analysis section 105, the control pointing detection holding section 106, the 2D image data generation section 107, the volume data generation section 108, the display image information generation section 109, and the rendering section 110 as circuiting including a combination of hardware and software, for example, a software functional section using the program stored in the storage device (not shown).

The control section 101 determines whether data has been received from the position detection section 202 (step S101). If determined otherwise, other processes are performed (step S102), and then the process is returned to step S101.

If the control section 101 determines in step S101 that data has been received from the position detection section 202, the control section 101 analyzes the received coordinate data (step S103), determining whether the coordinate data is pointing input made to draw an image in the image display field 201Px or that made in the control item menu in the frame area (step S104).

If the control section 101 determines in step S104 that the coordinate data is pointing input made in the control item menu in the frame area, the control section 101 determines which of the following control items, namely, the 2D/3D switching button 201SW, the color palette 201CP, the brush type selection section 201BP, the light source change section 201LE, the brightness adjustment section 201BRT, the color adjustment section 201CC, or the 3D reference shape selection section 201PS, was selected by pointing, storing the control item found as a result of the determination (step S105). Then, the control section 101 returns the process to step S101 following step S105, repeating the processes from S101 onward.

Further, if the control section 101 determines in step S104 that the coordinate data is pointing input made to draw an image in the image display field 201Px, the control section 101 refers to the status of the 2D/3D switching button 201SW, determining whether it is a 2D or 3D image that can be drawn (step S106).

If the control section 101 determines in step S106 that it is a 2D image that can be drawn, the control section 101 performs necessary processes to draw a 2D image in the same manner as described above (step S107) and then returns the process to step S101, repeating the processes from S101 onward.

On the other hand, if the control section 101 determines in step S106 that it is a 3D image that can be drawn, the control section 101 generates volume data based on the coordinate data as mentioned earlier (step S108). In this step S108, the brush type selected in the brush type selection section 201BP and the 3D reference shape selected in the 3D reference shape selection section 201PS are recognized prior to generation of volume data. Then, volume data for the recognized 3D reference shape is generated at the size according to the writing pressure and the recognized brush type.

Following this step S108, the control section 101 sets the two-dimensional surface PLo within the three-dimensional shape formed with the volume data as described earlier, generating the portion of volume data located on one side of the set surface PLo as data to be subjected to rendering (step S109).

Next, the control section 101 recognizes the light source position specified in the light source change section 201LE and also recognizes the adjustment levels selected in the brightness adjustment section 201BRT and the color adjustment section 201CC, applying surface rendering, in this example, to the target volume data generated in step S109 using these recognition results (step S110). Then, the control section 101 sends the 3D image that has undergone rendering to the display section 201, showing the image on the display screen of the display section 201 (step S111).

Effect of Embodiment

As has been described up to this point, if one simply generates volume data in a given 3D reference shape based on coordinate data, the image processing apparatus according to the present embodiment enables showing of pointing input in the form of a stroke made with the electronic pen 203 such that it has thickness as if it was drawn with an oil paint. Moreover, in the above embodiment, the size of the 3D reference shape serving as a reference for generating volume data changes in accordance with the writing pressure applied to the electronic pen 203. As a result, the user can change the oil paint thickness in accordance with the writing pressure, thus enabling representation of a painting in accordance with the actual brush stroke of the user.

Then, in the above embodiment, the size of the 3D reference shape serving as a reference for generating volume data can be changed in accordance with not only the writing pressure applied to the electronic pen 203 but also the brush type selected by the user, also allowing the user to represent painting in a desired manner in this respect.

Then, in the above embodiment, the 3D reference shape can be selected by the user. As a result, the above embodiment also has an advantageous effect in that the user can also select the oil paint thickness.

Other Embodiment or Modification Example

It should be noted that the processes performed by the target rendering data generation section 111 of the rendering section 110 are not limited to those described above. For example, the target rendering data generation section 111 sets a two-dimensional surface based on coordinate data of positions pointed to by the electronic pen 203 and deforms volume data generated by the volume data generation section such that the volume data can be arranged on the two-dimensional surface. That is, the target rendering data generation section 111 generates volume data to be subjected to rendering typically by cutting the volume data with the two-dimensional surface that includes the positions pointed to by the electronic pen 203 and arranging the cut surface on the two-dimensional surface.

Figure 7A:
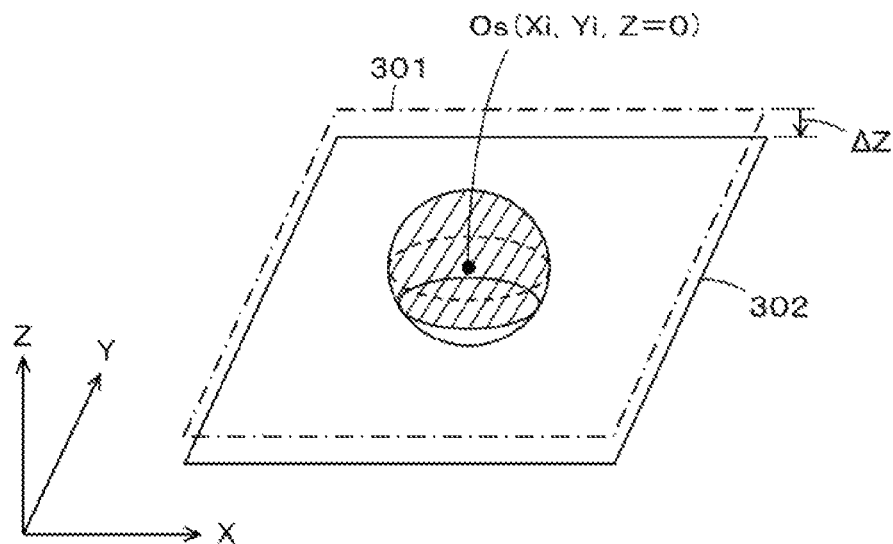
FIGS. 7A and 7B are diagrams for describing a modification example of the embodiment of the image processing apparatus according to the present disclosure.

Further, in the above embodiment, as a two-dimensional surface based on coordinate data of positions pointed to by the electronic pen 203, a fixed two-dimensional surface that has this coordinate data, is parallel with the sensor's x- and y-axis directions and has Z=0 is used. However, the set position of the two-dimensional surface based on coordinate data of positions pointed to by the electronic pen 203 may be user-variable rather than fixed. For example, the set position of the two-dimensional surface may be changed in the direction normal to the surface (e.g., negative z-axis direction) as illustrated in FIG. 7A. In the example illustrated in FIG. 7A, the two-dimensional surface (alternate long and short dashed line 301) shown in FIG. 5D is moved down by ΔZ in the direction normal to the surface (e.g., negative z-axis direction) to obtain a two-dimensional surface (solid line 302). In this case, there is volume data under a two-dimensional plane that has not been subjected to rendering. Therefore, rendering is applied again to the volume data on the upper side of the two-dimensional surface including the volume data under the two-dimensional plane.

Figure 7B:
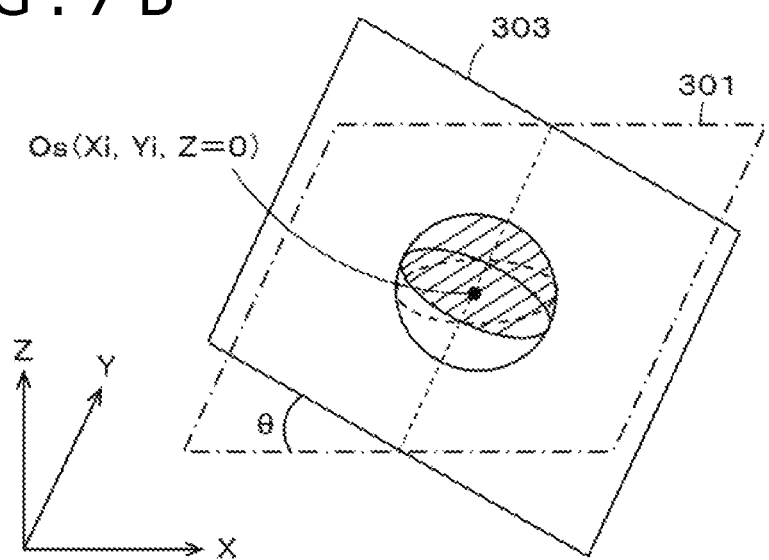

Alternatively, the set position of the two-dimensional surface may be changed by tilting the surface by a given tilt angle θ as illustrated in FIG. 7B. In the example illustrated in FIG. 7B, the two-dimensional surface (alternate long and short dashed line 301) shown in FIG. 5D is rotated by the angle θ around a straight line running along the y-axis direction that includes coordinate data (Xi, Yi) of positions pointed to by the electronic pen 203 as a rotational center to obtain a two-dimensional surface (solid line 303). It should be noted that if the two-dimensional surface is tilted, a change in the direction normal to the surface (z-axis direction) is permitted. Further, it is a matter of course that the two-dimensional surface may be tilted in any direction. Also in this case, there is volume data under a two-dimensional plane that has not been subjected to rendering. Therefore, rendering is applied again to the volume data on the upper side of the two-dimensional surface including the volume data under the two-dimensional plane. In either case, the rendering section 110 can make adjustment so that rendering is applied in real-time to the two-dimensional surface whose set position has been changed.

Further, a 3D and 2D mixed image may be drawn on the display screen of the display section 201 with the electronic pen 203 by switching the 2D/3D switching button 201SW.

Still further, in the above embodiment, the rendering execution section 112 of the rendering section 110 applies surface rendering to the target volume data. Instead, however, the rendering execution section 112 may apply volume rendering.

Still further, although, in the above embodiment, the brush type and the 3D reference shape are selectable independently from each other, a different 3D reference shape may be associated in advance with each brush type.

Other Modification Example

Although, in the above embodiment, an electronic pen is used as a pointer, a finger may be used instead. Further, although a capacitive pen is used, an electromagnetic or other kind of pen may also be used as an electronic pen.

Although the image processing apparatus includes the main body 100 of the image processing apparatus and the tablet terminal 200, the configuration thereof is not limited thereto. Instead, the main body 100 of the image processing apparatus may be integral with the tablet terminal 200. That is, the image processing apparatus according to the present disclosure may be configured in any way as long as it includes the functions of the main body 100 of the image processing apparatus and the functions of the position detection section 202 of the tablet terminal 200.

It is to be noted that the present disclosure is not limited to the foregoing embodiments, and that various changes can be made without departing from the spirit of the present disclosure.

What is claimed is:

1. An image processing apparatus comprising:
   detection circuitry, which, in operation, detects a position on a sensor that is pointed to by a pointer; and
   processing circuitry, which, in operation, generates three-dimensional data that includes the position detected by the detection circuitry, positions a two-dimensional surface relative to a display screen on which the three-dimensional data is displayable, and applies rendering to, at least, rendering target data of the three-dimensional data that is arranged on a first side of the two-dimensional surface to be displayed on the display screen, the rendering target data being defined based on the two-dimensional surface, the rendering not being applied to the three-dimensional data that is arranged on a second side of the two-dimensional surface, the second side of the two-dimensional surface being opposite the first side of the two-dimensional surface.

2. The image processing apparatus of claim 1, wherein the processing circuitry, in operation, positions the two-dimensional surface within the three-dimensional data based on the position detected by the detection circuitry and applies rendering to, at least, the rendering target data of the three-dimensional data that is arranged on the first side of the two-dimensional surface to be displayed on the display screen.

3. The image processing apparatus of claim 1, wherein
the processing circuitry, in operation, positions the two-dimensional surface based on the position detected by the position detection circuitry and deforms the three-dimensional data such that the three-dimensional data is arrangeable on the two-dimensional surface, arranges the deformed three-dimensional data on the first side of the two-dimensional surface, and applies rendering to, at least, the rendering target data of the three-dimensional data that is arranged on the first side of the two-dimensional surface to be displayed on the display screen.

4. The image processing apparatus of claim 3, wherein
the processing circuitry, in operation, cuts the three-dimensional data with a surface parallel with the two-dimensional surface and arranges the cut surface on the two-dimensional surface.

5. The image processing apparatus of claim 4, wherein
if a plurality of positions detected by the detection circuitry include a plurality of successive positions, the processing circuitry, in operation, generates the three-dimensional data for each of the successive positions and combines the generated three-dimensional data at each of the successive positions so as to generate three-dimensional data according to the successive positions.

6. The image processing apparatus of claim 1, wherein
the detection circuitry, in operation, detects a writing pressure applied to the pointer for each of a plurality of positions pointed to by the pointer, and
the processing circuitry, in operation, sizes a three-dimensional shape for each of the plurality of positions according to the writing pressure detected for each of the plurality of positions.

7. The image processing apparatus of claim 6, wherein
the three-dimensional shape is selectable from among a plurality of different shapes.

8. The image processing apparatus of claim 1, wherein
a position of the two-dimensional surface that is positioned by the processing circuitry is changeable.

9. The image processing apparatus of claim 2, wherein
the two-dimensional surface matches a sensor plane of the sensor.

10. The image processing apparatus of claim 6, wherein
the processing circuitry, in operation, selects a brush type, and
changes a size of the three-dimensional data in accordance with the brush type and the writing pressure.

11. The image processing apparatus of claim 1, wherein
the processing circuitry, in operation, selects a brush type, and
a three-dimensional shape of the three-dimensional data varies depending on the brush type.

12. The image processing apparatus of claim 1, wherein
the processing circuitry, in operation, applies surface rendering to, at least, the rendering target data of the three-dimensional data.

13. The image processing apparatus of claim 1, wherein
the processing circuitry, in operation, applies volume rendering to, at least, the rendering target data of the three-dimensional data.

14. The image processing apparatus of claim 1, wherein
the processing circuitry, in operation, generates a two-dimensional image from a detection signal at the position detected by the detection circuitry.

15. A non-transitory computer-readable medium storing a program that, when executed by a processor of an image processing apparatus, causes the image processing apparatus to:
generate three-dimensional data that includes a detected position on a sensor of the image processing apparatus that is pointed to by a pointer;
position a two-dimensional surface relative to a display screen on which the three-dimensional data is displayable; and
apply rendering to, at least, rendering target data of the three-dimensional data that is arranged on a first side of the two-dimensional surface to be displayed on the display screen, the rendering target data being defined based on the two-dimensional surface, the rendering not being applied to the three-dimensional data that is arranged on a second side of the two-dimensional surface, the second side of the two-dimensional surface being opposite the first side of the two-dimensional surface.

16. The non-transitory computer-readable medium of claim 15, wherein the program, when executed by the processor of the image processing apparatus, causes the image processing apparatus to:
position the two-dimensional surface based on the detected position and deform the three-dimensional data such that the three-dimensional data is arrangeable on the two-dimensional surface;
arrange the deformed three-dimensional data on the first side of the two-dimensional surface; and
applies rendering to the, at least, rendering target data of the three-dimensional data that is arranged on the first side of the two-dimensional surface to be displayed on the display screen.

17. The non-transitory computer-readable medium of claim 15, wherein the program, when executed by the processor of the image processing apparatus, causes the image processing apparatus to:
cut the three-dimensional data with a surface parallel with the two-dimensional surface and arrange the cut surface on the two-dimensional surface.

18. The non-transitory computer-readable medium of claim 15, wherein the program, when executed by the processor of the image processing apparatus, causes the image processing apparatus to:
if a plurality of successive positions is detected, generate the three-dimensional data for each of the successive positions and combine the generated three-dimensional data at each of the successive positions so as to generate three-dimensional data according to the successive positions.

19. The non-transitory computer-readable medium of claim 15, wherein the program, when executed by the processor of the image processing apparatus, causes the image processing apparatus to:
detect a writing pressure applied to the pointer for each of a plurality of positions pointed to by the pointer, and
size a three-dimensional shape for each of the plurality of positions according to the writing pressure detected for each of the plurality of positions.

20. The non-transitory computer-readable medium of claim 19, wherein the program, when executed by the processor of the image processing apparatus, causes the image processing apparatus to:
select a brush type; and change a size of the three-dimensional data in accordance with the brush type and the writing pressure.

* * * * *